United States Patent
Gunderson et al.

(10) Patent No.: US 7,377,954 B2
(45) Date of Patent: May 27, 2008

(54) PERFORMANCE AIR FILTRATION CARTRIDGE

(75) Inventors: Larry T. Gunderson, Sun Prairie, WI (US); Christopher E. Holm, Madison, WI (US); Kelly R. Schmitz, Rockton, IL (US); Zakir Ahmad Quabili, Hamtramck, MI (US); C. Raymond Cheng, Madison, WI (US)

(73) Assignee: Fleetguard, Inc., Nashville, TN (US)

( * ) Notice: Subject to any disclaimer, the term of this patent is extended or adjusted under 35 U.S.C. 154(b) by 513 days.

(21) Appl. No.: 11/044,775

(22) Filed: Jan. 27, 2005

(65) Prior Publication Data

US 2006/0162303 A1 Jul. 27, 2006

(51) Int. Cl.
*B01D 45/08* (2006.01)

(52) U.S. Cl. ............... 55/498; 55/497; 55/502; 55/494; 55/510; 55/529; 55/442; 55/444; 55/416; 55/410; 55/413; 55/414; 96/380; 96/383; 96/384; 96/385; 96/386; 96/387; 181/230

(58) Field of Classification Search ............ 55/497, 55/498, 502, 494, 442, 444, 510, 529, 416, 55/410, 413, 414; 96/380, 383–387; 181/230
See application file for complete search history.

(56) References Cited

U.S. PATENT DOCUMENTS

| | | | | |
|---|---|---|---|---|
| 2,815,088 A | * | 12/1957 | Gibel | 181/230 |
| 3,365,863 A | * | 1/1968 | Greipel et al. | 96/386 |
| 3,380,553 A | * | 4/1968 | Gibel | 181/230 |
| 4,065,276 A | | 12/1977 | Nakaya et al. | |
| 4,390,426 A | * | 6/1983 | Vicard | 210/243 |
| 4,732,585 A | * | 3/1988 | Lerner | 95/221 |
| 4,797,263 A | * | 1/1989 | Oza | 422/176 |
| 4,971,612 A | | 11/1990 | Loughran | |
| 5,140,957 A | | 8/1992 | Walker | |
| 5,417,727 A | | 5/1995 | Bowen et al. | |
| 5,792,247 A | | 8/1998 | Gillingham et al. | |
| 5,947,081 A | | 9/1999 | Kim | |
| 6,009,846 A | | 1/2000 | Walker, Jr. | |
| 6,120,573 A | * | 9/2000 | Call et al. | 55/442 |
| 6,550,446 B1 | | 4/2003 | Robley, Jr. | |
| 6,688,425 B2 | | 2/2004 | Cole et al. | |
| 6,802,388 B2 | | 10/2004 | Wolf et al. | |
| 6,802,880 B1 | | 10/2004 | Wijaya | |
| 2004/0255660 A1 | | 12/2004 | Abdolhosseini et al. | |
| 2005/0022482 A1 | * | 2/2005 | Bockle et al. | 55/321 |

OTHER PUBLICATIONS

Delphi Device, admitted prior art. Missing Date? Year?
WOCO Device, admitted prior art. Missing Date? Year?
Siemens Device, admitted prior art. Missing Date ? Year?

* cited by examiner

*Primary Examiner*—Duane Smith
*Assistant Examiner*—Minh-Chau T. Pham
(74) *Attorney, Agent, or Firm*—Andrus, Sceales, Starke & Sawall, LLP; J. Bruce Schelkopf

(57) ABSTRACT

An air filtration cartridge has annular filter media having a hollow interior and extending axially between first and second distally opposite end caps. The first end cap is an outlet end cap having flow straightening structure integrally formed therewith and spanning the hollow interior. The second end cap is a closed end cap having an interior face having quarter wave resonators formed by blind holes therein.

25 Claims, 6 Drawing Sheets

PERFORMANCE AIR FILTRATION CARTRIDGE

BACKGROUND AND SUMMARY

The invention relates to air filtration cartridges.

Air filtration cartridges are known in the prior art and are typically provided by annular filter media having a hollow interior and extending axially between first and second distally opposite end caps, one of which is an outlet end cap, and the other of which may be closed. In internal combustion engine applications, engine manufacturers are increasingly demanding filters which do not interfere with mass air flow sensors (MAFS) that are typically placed directly downstream from the filter cartridge and are sensitive to filter cartridge geometry/imperfections causing variable and inconsistent air flow velocity profiles. In the case of turbo/supercharged engines, there is an increasing demand for sound attenuation. The latter requirement is typically satisfied by incorporating a separate device in the system, though a more cost effective solution would be desirable.

The present invention arose during development efforts directed toward the above needs.

DETAILED DESCRIPTION

Figure 1:
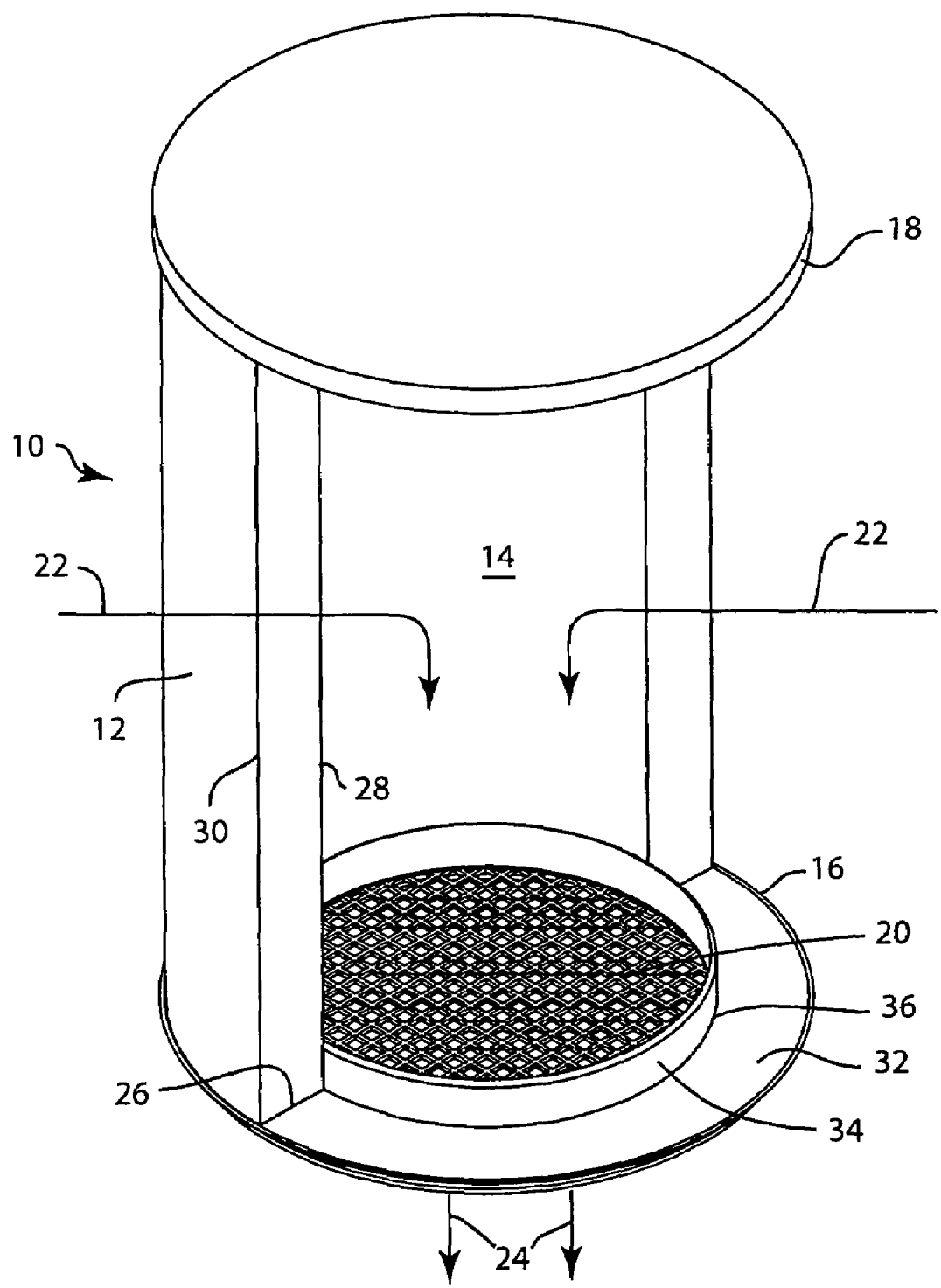
FIG. 1 is a perspective view partially cut-away of an air filtration cartridge in accordance with the invention.
Figure 5:
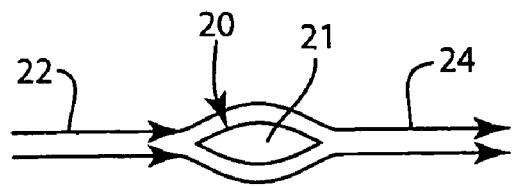
FIG. 5 is a sectional view taken along line 5-5 of FIG. 4.

FIG. 1 shows an air filtration cartridge 10 including annular filter media 12 having a hollow interior 14 and extending axially between first and second distally opposite end caps 16 and 18. End cap 16 is an outlet end cap having flow straightening structure 20 integrally formed therewith and spanning hollow interior 14. Air flows radially inwardly as shown at arrows 22 through filter media 12 into hollow interior 14 and then flows from hollow interior 14 axially through flow straightening structure 20 as shown at arrows 24. Flow straightening structure 20 is preferably provided by a grid or matrix having a plurality of openings or apertures therethrough guiding and straightening axial flow at 24 for reducing variability of outlet air flow velocity profile, i.e. providing a more uniform air flow velocity across the entire radial span of the filter cartridge outlet, in the nature of a laminar flow. In a desirable preferred embodiment, the air filtration cartridge is an embedded air filtration cartridge having an injection molded plastic end cap 16 injection molded to media 12 and including plastic flow straightening structure 20 integrally molded therewith. In another embodiment, an injection molded plastic flow straightener is embedded in a radial seal urethane element during curing of the latter. It is desirable that the cross-sectional wall thickness of the grid segments be as thin as possible, to maximize the open area therebetween for air flow therethrough. In a further embodiment, the grid segments 21 of grid 20 have an aerodynamic cross-sectional shape, FIG. 5, e.g. a tear-drop shape or the like.

Figure 2:
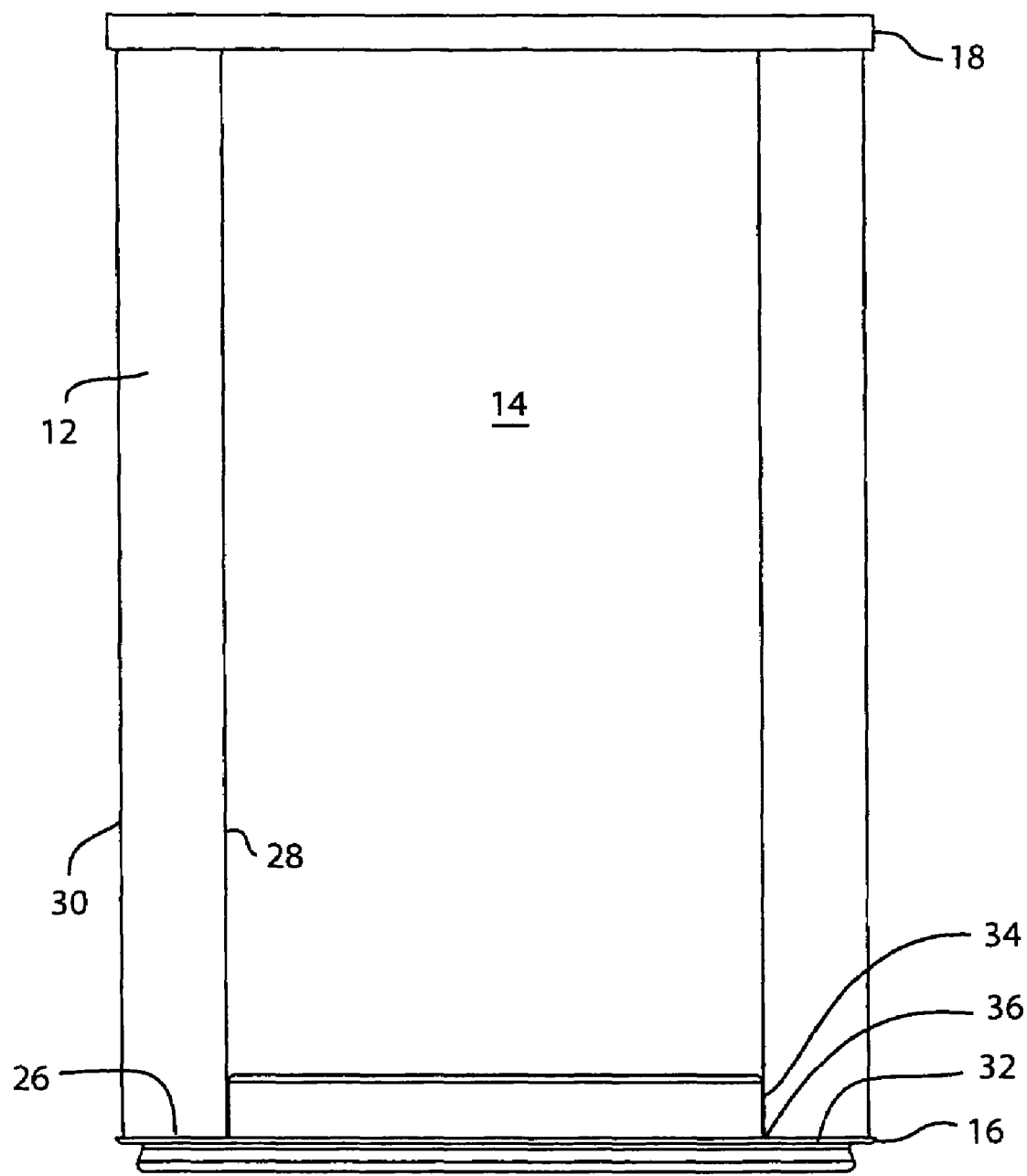
FIG. 2 is a sectional view of the structure of FIG. 1.

Filter media 12 has an axial end face 26, FIGS. 1, 2, extending radially between inner and outer perimeters 28 and 30. End cap 16 has an integral radial flange 32 extending radially along axial end face 26. End cap 16 has an integral axial flange 34 extending axially along inner perimeter 28. Flow straightening structure 20 extends across hollow interior 14 integrally from at least one of radial flange 32 and axial flange 34. In preferred form, radial and axial flanges 32 and 34 intersect at an interface junction 36, and flow straightening structure 20 extends across hollow interior 14 integrally from junction 36. In the preferred embodiment, flow straightening structure 20 is a plastic grid, FIGS. 3, 4, having an outer perimeter integrally extending from junction 36, FIG. 1. Junction 36 has a T-shape in cross-section, namely an axially extending trunk provided by axial flange 34, and a pair of arms extending oppositely radially therefrom, a first of the arms being provided by radial flange 32, and a second of the arms being provided by the outer perimeter of grid 20, wherein the trunk and the arms meet at junction 36 in the noted T-shape.

Figure 3:
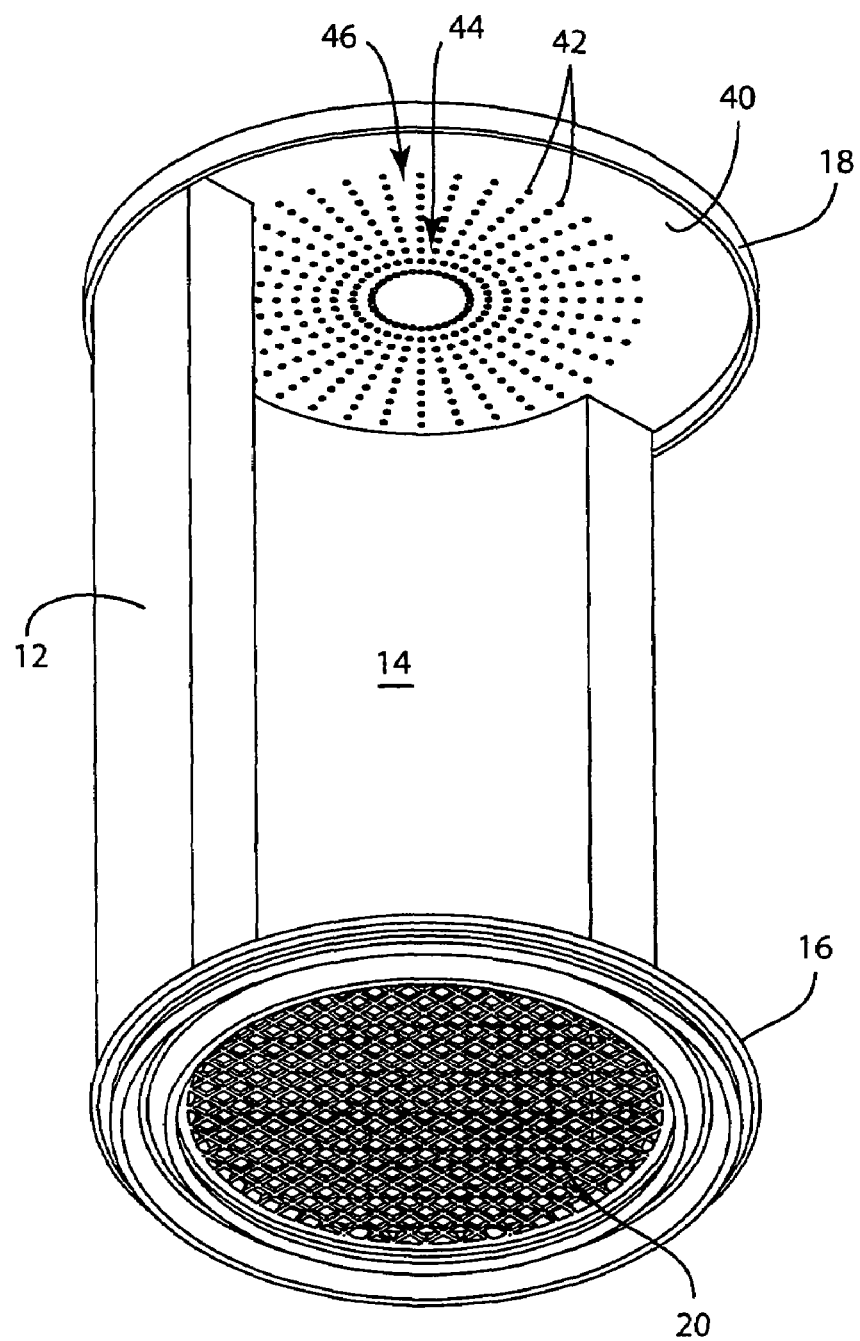
FIG. 3 is a perspective view of another angle of an air filtration cartridge in accordance with the invention.
Figure 4:
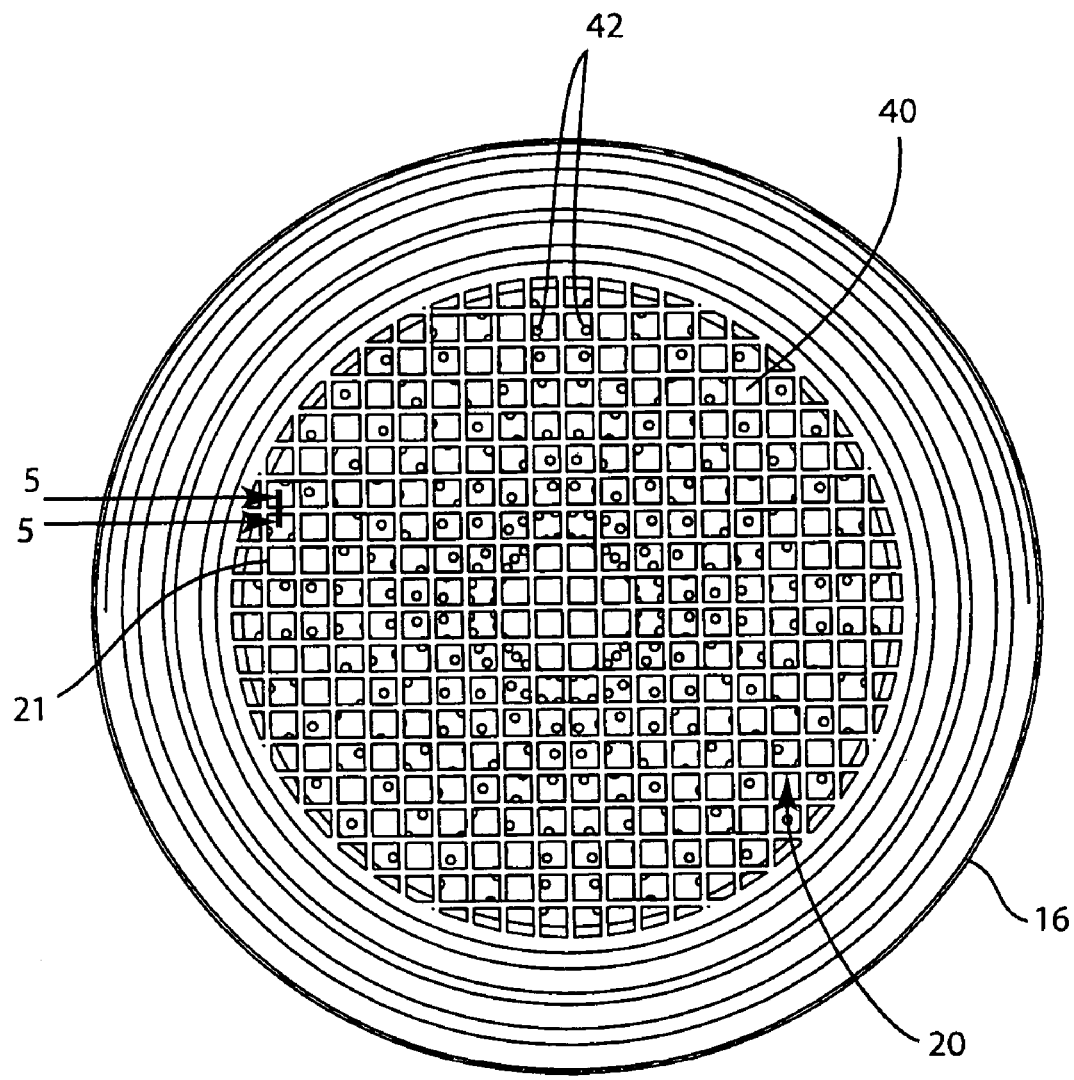
FIG. 4 is an end elevation view of the construction of FIG. 3.

End cap 18, FIGS. 1-3, is a closed end cap having an interior face 40, FIG. 3, facing hollow interior 14 and having quarter wave resonators formed by blind holes 42 therein. In preferred form, the air filtration cartridge is an embedded air filtration cartridge having an injection molded plastic end cap 18 injection molded thereto and including blind holes 42 therein forming the quarter wave resonators. The quarter wave resonators are used for high frequency sound attenuation, e.g. for turbo/supercharged engines which require high frequency sound attenuation.

In one embodiment, interior face 40, FIG. 3, of end cap 18 has a first area 44 of a first density of quarter wave resonator blind holes, and has a second area 46 radially outward of first area 44 and of a second density of quarter wave resonator blind holes. The noted second density is less than the noted first density. In preferred form, the quarter wave resonator blind holes have an axial depth in the range of about 5 to 8 mm, and have a radial width in the range of about 2 to 3 mm. In another embodiment, a first set of one or more resonator holes has a first depth, and one or more additional sets of one or more resonator holes have different depths, for attenuation of different frequencies.

Figure 6:
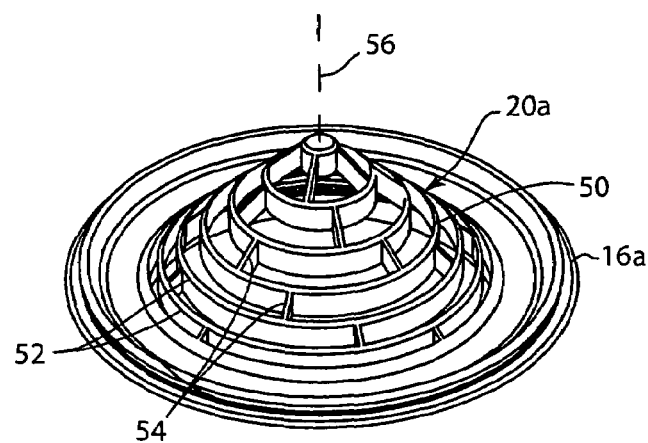
FIG. 6 is a perspective view of an alternate embodiment of a portion of the structure of FIG. 1.
Figure 7:
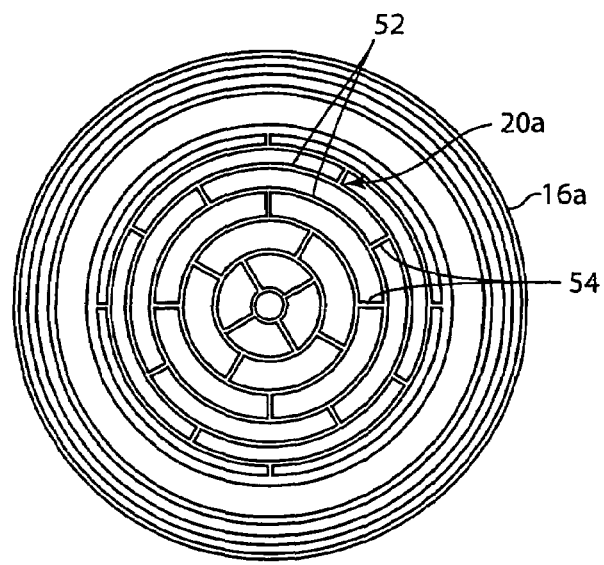
FIG. 7 is an end elevation view of the structure of FIG. 6.
Figure 8:
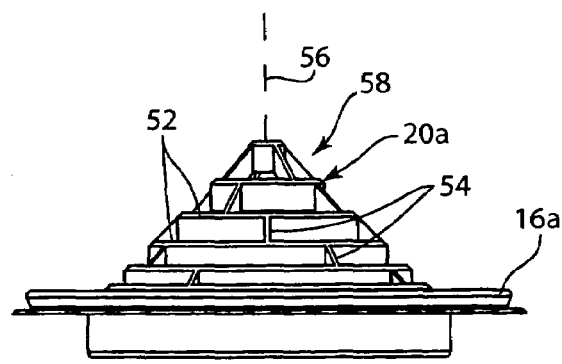
FIG. 8 is a side elevation view of the structure of FIG. 6.
Figure 9:
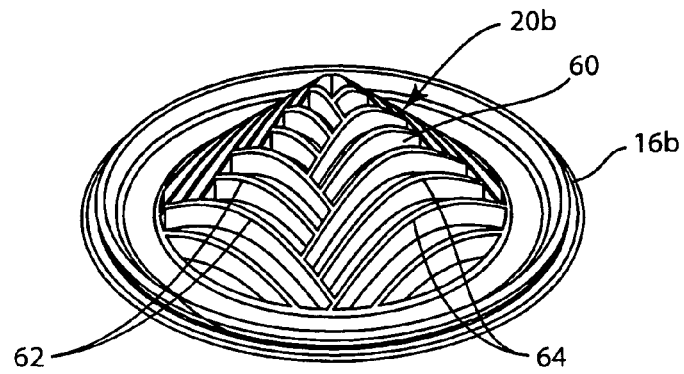
FIG. 9 is a perspective view of another alternate embodiment of a portion of the structure of FIG. 1.
Figure 10:
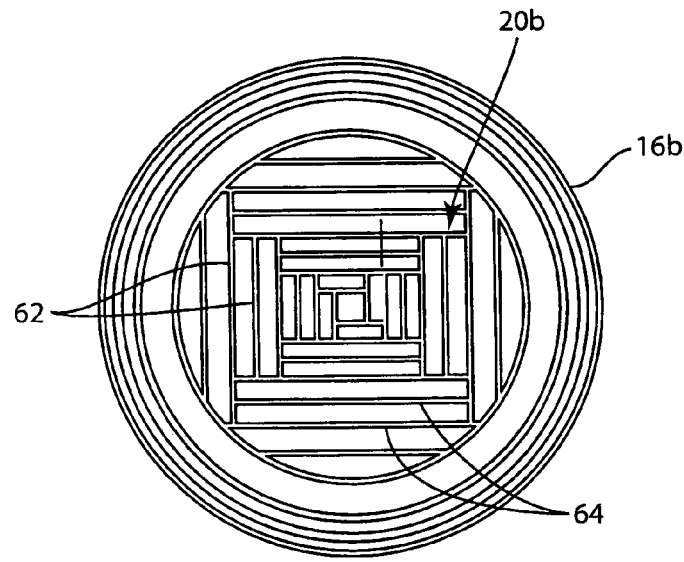
FIG. 10 is an end elevation view of the structure of FIG. 9.
Figure 11:
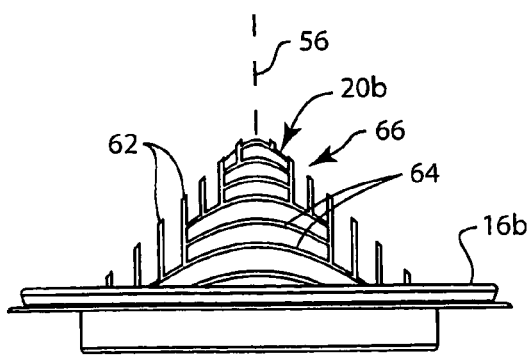
FIG. 11 is a side elevation view of the structure of FIG. 9.
Figure 12:
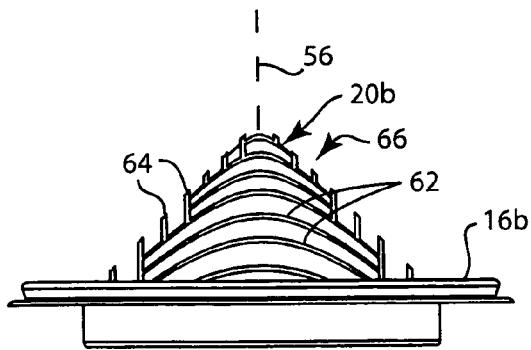
FIG. 12 is a side elevation view of the structure of FIG. 9, turned 90° relative to FIG. 11.

In a further embodiment, FIGS. 6-8, flow straightening structure 20a is provided by a grid having grid segments formed by a plurality of guide vanes 50 guiding the air flow axially through the first end cap 16a of air filtration cartridge 10. The guide vanes include first and second sets of guide vanes 52 and 54 extending transversely to each other. Guide vanes 52 of the first set extend arcuately relative to the axis 56 of axial flow 24. Guide vanes 54 of the second set extend radially relative to axis 56. The guide vanes have a configured axial extension such that first end cap 16a of air filtration cartridge 10 has an outer conical profile 58, FIG. 8, pointing along the axis 56 of axial flow 24.

In a further embodiment, FIGS. 9-12, flow straightening structure 20b is provided by a grid having grid segments provided by a plurality of guide vanes 60 guiding the air flow axially through the first end cap 16b of air filtration cartridge 10. The guide vanes include at least first and second sets of guide vanes 62 and 64 extending transversely to each other. The guide vanes 62 and 64 of each of the first and second sets extend tangentially relative to axial flow 24. The guide vanes have a configured axial extension such that first end cap 16b of air filtration cartridge 10 has an outer conical profile 66, FIGS. 11, 12, pointing along the axis 56 of axial flow 24.

It is recognized that various equivalents, alternatives and modifications are possible within the scope of the appended claims. While a circular cylindrical filter media and cartridge is shown, other annular constructions may be used, including oval-shaped, racetrack-shaped, and various closed-loop configurations. The cartridge may include various sealing structures and gaskets for sealingly mating or mounting within a housing, in accordance with known sealing techniques using a separate sealing member or gasket and/or may have a seal integrally formed with one or both of the end caps, for example as shown in commonly owned co-pending U.S. patent application Ser. No. 10/726,974, filed Dec. 3, 2003, U.S. patent application Ser. No. 10/827,509, filed Apr. 19, 2004, U.S. patent application Ser. No. 10/952,631, filed Sep. 29, 2004, U.S. patent application Ser. No. 10/997,257, filed Nov. 24, 2004, all incorporated herein by reference.

What is claimed is:

1. An air filtration cartridge comprising annular filter media having a hollow interior and extending axially between first and second distally opposite end caps, said first end cap being an outlet end cap having flow straightening structure integrally formed therewith and spanning said hollow interior, such that air flows from said hollow interior axially through said flow straightening structure of said first end cap of said air filtration cartridge for reducing variability of outlet air flow velocity profile.

2. The air filtration cartridge according to claim 1 wherein said air filtration cartridge is an embedded air filtration cartridge having an injection molded plastic said first end cap including plastic said flow straightening structure integrally molded therewith.

3. The air filtration cartridge according to claim 2 wherein said filter media has an axial end face extending radially between inner and outer perimeters, said first end cap has an integral radial flange extending radially along said axial end face, and an integral axial flange extending axially along said inner perimeter, and wherein said flow straightening structure extends across said hollow interior integrally from at least one of said radial flange and said axial flange.

4. The air filtration cartridge according to claim 3 wherein said radial and axial flanges intersect at an interface junction, and wherein said flow straightening structure extends across said hollow interior integrally from said junction.

5. The air filtration cartridge according to claim 4 wherein said flow straightening structure comprises a plastic grid having an outer perimeter integrally extending from said junction.

6. The air filtration cartridge according to claim 5 wherein said junction has a T-shape, namely an axially extending trunk provided by said axial flange, and a pair of arms extending oppositely radially therefrom, a first of said arms provided by said radial flange, a second of said arms provided by said outer perimeter of said grid, said trunk and said arms meeting at said junction in said T-shape.

7. The air filtration cartridge according to claim 1 wherein said flow straightening structure comprises a grid having grid segments having a cross-sectional aerodynamic shape.

8. The air filtration cartridge according to claim 7 wherein said aerodynamic shape of said grid segments is a tear-drop shape.

9. The air filtration cartridge according to claim 1 wherein said flow straightening structure comprises a grid having grid segments comprising a plurality of guide vanes guiding said air flow axially through said first end cap of said air filtration cartridge.

10. The air filtration cartridge according to claim 9 wherein said guide vanes comprise first and second sets of guide vanes extending transversely to each other.

11. The air filtration cartridge according to claim 10 wherein said guide vanes of said first set extend arcuately relative to the axis of said axial flow, and said guide vanes of said second set extend radially relative to said axis.

12. The air filtration cartridge according to claim 10 wherein said guide vanes of each of said first and second sets extend tangentially relative to said axial flow.

13. The air filtration cartridge according to claim 9 wherein said guide vanes have a configured axial extension such that said first end cap of said air filtration cartridge has an outer conical profile pointing along the axis of said axial flow.

14. An air filtration cartridge comprising annular filter media having a hollow interior and extending axially between first and second end caps, said first end cap being an outlet end cap, said second end cap being a closed end cap having an interior face facing said hollow interior and having quarter wave resonators formed by blind holes therein.

15. The air filtration cartridge according to claim 14 wherein said air filtration cartridge is an embedded air filtration cartridge having an injection molded plastic said second end cap including said blind holes therein forming said quarter wave resonators.

16. The air filtration cartridge according to claim 14 wherein said interior face of said second end cap has a first area of a first density of said quarter wave resonator blind holes, and has a second area of a second density of quarter wave resonator blind holes, said second density being less than said first density.

17. The air filtration cartridge according to claim 16 wherein said second area is radially outward of said first area.

18. The air filtration cartridge according claim 14 wherein said quarter wave resonator blind holes have an axial depth in the range of about 5 to 8 mm.

19. The air filtration cartridge according to claim 18 wherein said quarter wave resonator blind holes have a radial width in the range of about 2 to 3 mm.

20. The air filtration cartridge according to claim 14 wherein said interior face of said second end cap has a first set of one or more quarter wave resonator blind holes of a first axial depth, and one or more additional sets of one or more quarter wave resonator blind holes of a different axial depth, for attenuation of different frequencies.

21. An air filtration cartridge comprising in combination annular filter media having a hollow interior and extending axially between first and second distally opposite end caps, said first end cap being an outlet end cap having flow straightening structure integrally formed therewith and spanning said hollow interior, such that air flows from said hollow interior axially through said flow straightening structure of said first end cap for reducing variability of outlet air flow velocity profile, said second end cap being a closed end cap having an interior face facing said hollow interior and having quarter wave resonators formed by blind holes therein.

22. The air filtration cartridge according to claim 21 wherein said air filtration cartridge is an embedded air filtration cartridge having an injection molded plastic said first end cap including plastic said flow straightening structure integrally molded therewith, and an injection molded said second end cap including said blind holes therein forming said quarter wave resonators.

23. The air filtration cartridge according to claim 22 wherein said filter media has an axial end face extending radially between inner and outer perimeters, said first end cap has an integral radial flange extending radially along said axial end face, and an integral axial flange extending axially along said inner perimeter, and wherein said flow straightening structure extends across said hollow interior integrally from at least one of said radial flange and said axial flange, and wherein said quarter wave resonator blind holes have an axial depth in the range of about 5 to 8 mm.

24. The air filtration cartridge according to claim 23 wherein said radial and axial flanges intersect at an interface junction, and wherein said flow straightening structure extends across said hollow interior integrally from said junction, said flow straightening structure comprises a plastic grid having an outer perimeter integrally extending from said junction, and said junction has a T-shape, namely an axially extending trunk provided by said axial flange, and a pair of arms extending oppositely radially therefrom, a first of said arms provided by said radial flange, a second of said arms provided by said outer perimeter of said grid, said trunk and said arms meeting at said junction in said T-shape.

25. The air filtration cartridge according to claim 21 wherein said interior face of said second end cap has a first area of a first density of said quarter wave resonator blind holes, and has a second area of a second density of quarter wave resonator blind holes, said second density being less than said first density, and wherein said quarter wave resonator blind holes have a radial width in the range of about 2 to 3 mm.

* * * * *